Sept. 29, 1931.       R. P. LANSING           1,824,824
                    ELECTRICAL APPARATUS
                     Filed May 23, 1929
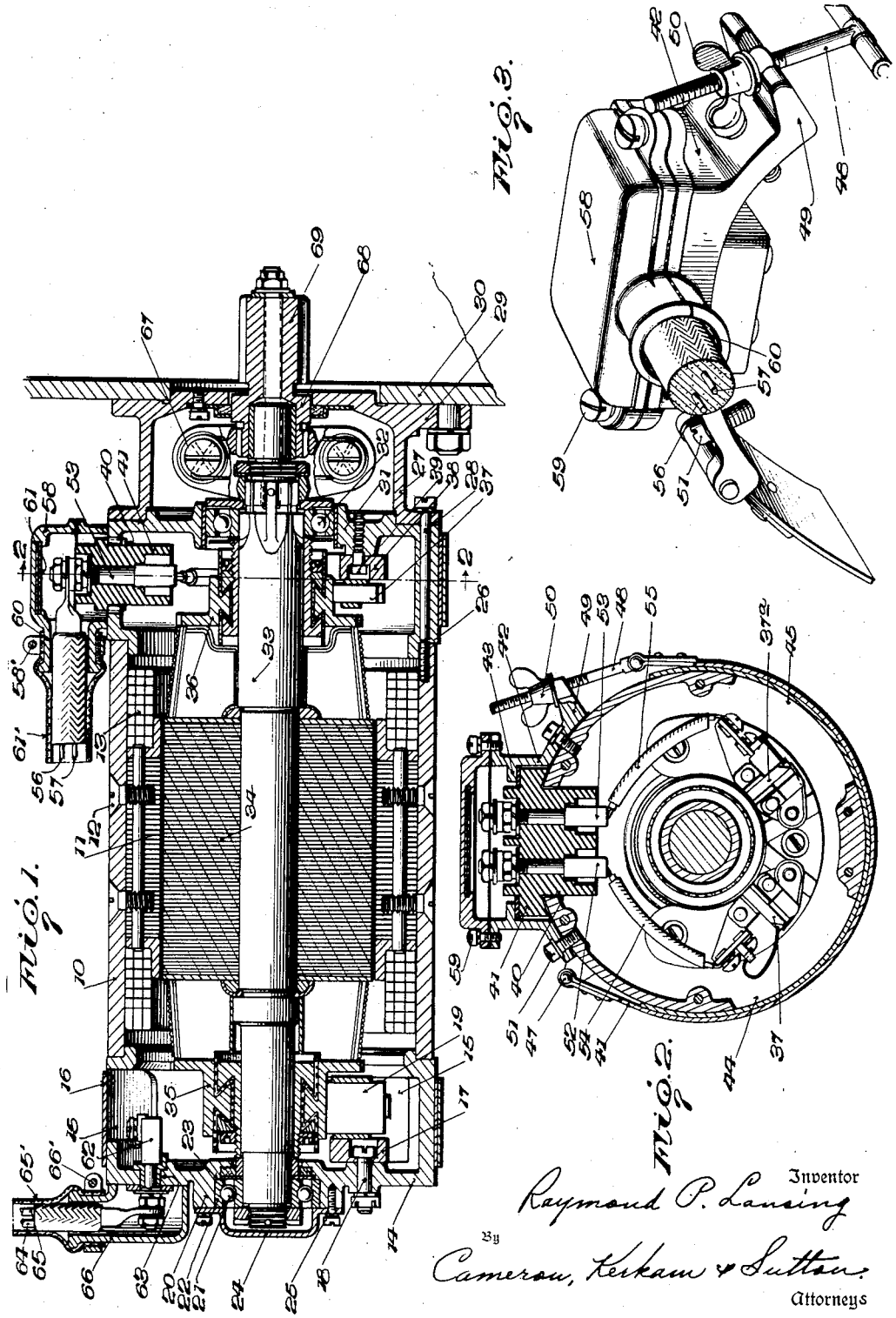
Inventor
Raymond P. Lansing
By
Cameron, Kerkam & Sutton
Attorneys Patented Sept. 29, 1931

1,824,824

UNITED STATES PATENT OFFICE

RAYMOND P. LANSING, OF MONTCLAIR, NEW JERSEY, ASSIGNOR TO ECLIPSE MACHINE COMPANY, OF ELMIRA HEIGHTS, NEW YORK, A CORPORATION OF NEW YORK

ELECTRICAL APPARATUS

Application filed May 23, 1929. Serial No. 365,494.

This invention relates to electrical apparatus, and more particularly to means for generating electrical power.

One of the objects of the present invention is to provide a novel electrical generator mechanism, particularly adapted for use with radio apparatus, which is simple in construction and efficient in action.

Another object is to provide a novel casing and shielding means for an electrical generator, and particularly for the brushes, leads and terminals thereof, whereby the operation of the generator will not interfere with the reception and transmission of radio signals.

The above and other objects will appear more fully from the following detailed description of the construction and mode of operation thereof, taken in connection with the accompanying drawings, in which:

Fig. 1 is an axial section of a structure constituting one embodiment of the present invention;

Fig. 2 is a vertical section taken substantially on the line 2—2 of Fig. 1; and

Fig. 3 is an enlarged detailed view showing in perspective the novel casing and shielding means.

As shown in Fig. 1, the generator comprises a field yoke 10 of generally cylindrical shape, provided interiorly thereof with a plurality of pole pieces 11 suitably attached thereto as by means of screws 12, and formed to clamp the energizing field coils 13 to the inner surface of the yoke 10. A front head 14 is removably secured to the front end of yoke 10 in any suitable manner, and is provided with one or more window openings 15 giving access to the interior of the head 14 for the purposes of observation or adjustment of parts therein, and which are normally closed during the operation of the generator, as by means of a removable window closing band 16. A brush holder 17 is mounted within the head 14 by suitable means such as bolts 18 and carries a plurality of brushes 19 only one of which is illustrated. The head 14 is also provided with a bearing boss 20 and an anti-friction bearing 21 is adapted to be seated therein with its outer race 22 clamped between a shoulder 23 thereon and a cover member 24 suitably fixed thereto as by means of cap screws 25.

A back head member 26 is removably mounted on the back end of yoke member 10, and a generally cylindrical casing member 27 is removably attached thereto, these members being preferably held in assembled relation by suitable common attaching means such as cap screws 28 threaded within the end of yoke member 10. Casing member 27 is provided with a mounting flange 29 which may be used to secure the generator assembly to suitable power means such as an internal combustion engine, a portion of which is indicated at 30.

The back head 26 is provided with a bearing boss 31, adapted to receive an antifriction bearing 32. An armature shaft 33 is rotatably mounted within bearings 21 and 32, and carries a laminated core 34, adapted to rotate between the field pole pieces 11, and carrying a low voltage armature winding, the coils of which are connected to the bars of a commutator 35 on the front end of armature shaft 34, and adapted to cooperate with the brushes 19 within the front head 14. The armature core also carries a high voltage winding, the coils of which are connected to the bars of a commutator 36 mounted on armature shaft 34 within the back head member 26 and adapted to cooperate with brushes, one of which is shown at 37, carried by a brush holder 38 suitably mounted on the bearing boss 31 as by means of screws 39.

Back head 26 is provided with an opening 40, and a block of insulating material 41 is formed to fit within and around said opening. A metallic auxiliary casing or shielding member 42 is adapted to fit over the opening 40 and is provided with an internal shoulder 43 which is adapted to cooperate with the periphery of the insulating block 41 and clamp the same tightly to the back head 26. The back head 26 is provided with windows 44 and 45 to permit observation and adjustment of the parts therein, and a closure band 46 for said windows 44 and 45 is hinged to the shield member 42 at one end by suitable means such as a pin 47, and is adapted to be adjustably attached to the member 42 at its other end as by means of a T bolt 48 passing through a slotted arm 49 of shield member 42, and having a wing nut 50 adapted to bear thereon. Suitable additional fastening means such as cap screws 51, threaded into the back head 26, may be provided in order to center and fix the shield member 42 on the back head.

A pair of threaded terminal members 52 and 53 are adapted to be mounted in the insulating block 41, with their inner ends connected to the brushes 37 and 37a, respectively, as by means of brush leads 54 and 55. The outer ends of terminals 52 and 53 are arranged to act as binding posts for high tension leads 56 and 57 formed as a suitably insulated cable leading to the apparatus to be energized by the generator.

A metallic cap member 58 is adapted to fit closely over the shield member 42, being suitably fixed thereto as by means of screws 59, and completely enclosing the terminals 52 and 53 except for an opening 60 formed between the shield 42 and cap 58 in order to allow the entrance of cables 56 and 57. Cap 58 is preferably provided with an insert 61 of suitable insulating material arranged above the ends of terminals 52 and 53 in order to prevent accidental shorting of said terminals by the cap member.

The cabled leads 56 and 57 are provided with a suitable flexible metallic sheathing 61' fixed to and grounded on the cap 58 as by means of a clamp 58', whereby the cable is completely shielded in a grounded metallic conduit.

Suitable low tension terminal members, one of which is shown at 62, are mounted in the end of the front head 14, being insulated therefrom as indicated at 63, and are connected at their inner ends to the leads from brushes 19. The outer ends of the low tension terminals are formed to provide binding posts for the low tension leads 64 and 65, and are enclosed by a suitable metallic cap member 66. Leads 64 and 65 are also formed as a suitably insulated cable provided with a flexible metallic sheathing 65' fixed to and grounded on the cap 66 as by means of clamping member 66' so that the entire system is completely shielded and interference with radio reception prevented.

The rear end of armature shaft 33 may be connected by means of a yielding coupling 67 of any suitable character to a driving shaft 68 which is arranged to be telescoped on the end of armature shaft 33 and which is provided with a connecting member 69 adapted to be driven by a rotating part of the engine or a member actuated thereby.

In operation, rotation of the armature by the driving shaft 69 will cause the simultaneous generation of a low voltage current which is picked up by the brushes 19 and conducted to the cables 64 and 65, and a high tension current which is delivered to the brushes 37 and 37a and conducted to the cables 56 and 57. It will be understood that the field coil 13 may be energized from either of the generated voltages, but ordinarily will preferably be energized from the low voltage mains. It will be noted that by reason of the heavy insulation and complete shielding of the high and low tension leads from the generator, fluctuation or failure of the flow current are guarded against, and electrical disturbances which might interfere with radio reception or transmission, are entirely prevented.

It will be understood that although but one embodiment of the present invention has been shown and described, various changes might be made therein, such as the transposition of the low and high tension ends of the generator, and other variations in the position, adjustment, or composition of parts might be made without departing from the spirit of the invention, the scope of the invention being defined by the claims appended hereto.

What is claimed is:

1. In an electrical generator, an armature winding, means for collecting the current generated in said winding, a casing for said generator having a plurality of openings in the plane of said collecting means, an output electrode, means for mounting said electrode in one of said openings, means for closing the remaining openings, a metallic shield for said electrode, and a common means for attaching said electrode shield and said closure means to the casing.

2. In an electrical generator, an armature winding, means for collecting the current generated in said winding, a casing for said generator having a plurality of openings in the plane of said collecting means, an output electrode mounted in one of said openings and connected to the current collecting means, means for closing the remaining openings, and a common means for shielding said electrode and for attaching said electrode and said closure means to the casing.

3. In an electrical generator, an armature winding, means for collecting the current generated in said winding, a casing for said generator having a plurality of openings in the plane of said collecting means, a block of insulating material positioned in one of said openings, an output electrode mounted in said block and connected to said current collecting means, means for closing the remaining openings in said casing, and a common means for attaching the insulating block and said closure means to the casing.

4. In an electrical generator, an armature winding, means for collecting the current generated in said winding, a casing for said generator having a plurality of openings in the plane of said collecting means, a block of insulating material positioned in one of said openings, an output electrode mounted in said block and connected to said current collecting means, a band encircling the casing and closing the remaining openings, and a shielding member fitting over the electrode and clamping the insulating block and the closure band to the casing.

5. In an electrical generator, an armature winding, means for collecting the current generated in said winding, a casing for said generator having a plurality of openings in the plane of said collecting means, a block of insulating material positioned in said opening, an output electrode mounted in said block and connected to said current collecting means, and a shielding member fitting over the electrode and clamping the insulating block to the main casing.

6. In an electrical generator, an armature winding, means for collecting the current generated in said winding, a casing for said generator having a plurality of openings in the plane of said collecting means, a block of insulating material positioned in one of said openings, an output electrode mounted in said block and connected to said current collecting means, a metallic auxiliary casing member partly enclosing and shielding the electrode and having means for clamping the insulating block to the main casing, and a metallic cap for closing the auxiliary casing and completing the shield of the electrode.

7. In an electrical generator, an armature winding, means for collecting the current generated in said winding, a casing for said generator having a plurality of openings in the plane of said collecting means, an insulated output electrode mounted in one of said openings and connected to the current collecting means, an auxiliary casing member partly enclosing and shielding the electrode, and a metallic cap for closing the auxiliary casing and completely shielding the electrode, said cap being provided on its interior surface with an insert of insulating material.

8. In an electrical generator, an armature winding, means for collecting the current generated in said winding, a casing for said generator having a plurality of openings in the plane of said collecting means, a block of insulating material positioned in one of said openings, a pair of output electrodes mounted in said block and connected to the current collecting means, a removable band for closing the remaining openings, a metallic auxiliary casing member partly enclosing and shielding the electrodes and having means for attaching the insulating block and the band to the main casing, and a metallic cap for closing the auxiliary casing and completely shielding the electrodes, said cap having an insert of insulating material opposite the terminals of said electrodes.

9. In a generator, a casing having a plurality of openings, a metallic cable shield secured to said casing and adapted to close one of said openings, a band for closing other of said openings, and means for removably securing said band to said shield.

In testimony whereof I have signed this specification.

RAYMOND P. LANSING.